(12) United States Patent
Nakhjiri et al.

(10) Patent No.: US 8,005,224 B2
(45) Date of Patent: Aug. 23, 2011

(54) TOKEN-BASED DYNAMIC KEY DISTRIBUTION METHOD FOR ROAMING ENVIRONMENTS

(75) Inventors: Madjid F. Nakhjiri, Kirkland, WA (US); Changsheng Wan, Nanjing (CN)

(73) Assignee: FutureWei Technologies, Inc., Plano, TX (US)

( * ) Notice: Subject to any disclaimer, the term of this patent is extended or adjusted under 35 U.S.C. 154(b) by 1032 days.

(21) Appl. No.: 11/685,884

(22) Filed: Mar. 14, 2007

(65) Prior Publication Data

US 2008/0229107 A1 Sep. 18, 2008

(51) Int. Cl.
*H04K 1/00* (2006.01)
(52) U.S. Cl. ........ 380/272; 713/155; 713/168; 713/172; 726/2; 726/3; 455/411; 455/436; 709/220; 709/223; 709/237; 380/255; 380/270; 370/331
(58) Field of Classification Search .................. 455/411, 455/436; 709/220, 223, 237; 380/255, 270, 380/272; 713/155, 168, 172; 726/2, 3; 370/331
See application file for complete search history.

(56) References Cited

U.S. PATENT DOCUMENTS

| | | | |
|---|---|---|---|
| 6,370,380 B1 * | 4/2002 | Norefors et al. .............. | 455/436 |
| 7,421,582 B2 * | 9/2008 | Fu et al. .................. | 713/169 |
| 2002/0114469 A1 * | 8/2002 | Faccin et al. .................. | 380/270 |
| 2002/0118674 A1 | 8/2002 | Faccin et al. | |
| 2002/0178358 A1 | 11/2002 | Perkins et al. | |
| 2003/0014646 A1 * | 1/2003 | Buddhikot et al. .......... | 713/184 |
| 2003/0061509 A1 | 3/2003 | Fisher | |
| 2003/0091013 A1 * | 5/2003 | Song et al. .................. | 370/338 |
| 2003/0091030 A1 | 5/2003 | Yegin et al. | |
| 2003/0147537 A1 * | 8/2003 | Jing et al. ................. | 380/277 |
| 2004/0066764 A1 * | 4/2004 | Koodli et al. ................ | 370/331 |
| 2004/0077335 A1 | 4/2004 | Lee et al. | |
| 2005/0125677 A1 | 6/2005 | Michaelides | |
| 2005/0125684 A1 | 6/2005 | Schmidt | |
| 2005/0135624 A1 * | 6/2005 | Tsai et al. ................. | 380/270 |

(Continued)

FOREIGN PATENT DOCUMENTS

CN 1564626 A 1/2005

(Continued)

OTHER PUBLICATIONS

Jung-Min Park et al, A ticket-based AAA security mechanism in mobile IP network, pp. 210-219, Springer-Verlag, 2003.*

(Continued)

*Primary Examiner* — Nasser Moazzami
*Assistant Examiner* — Shanto M Abedin
(74) *Attorney, Agent, or Firm* — Slater & Matsil, L.L.P.

(57) ABSTRACT

A method for establishing a new security association between a mobile node and a network source, the method comprising creating a first token comprising a security association between a network source and a mobile node, the first token being encrypted using a first key known to the mobile node and a first trust authority within a home network associated with the mobile node, and creating a second token comprising the same security association between the network source and the mobile node, the second token being encrypted using a second key known to the first trust authority and a second trust authority associated with the network source, wherein the first token and the second token are sent to the second trust authority using a chain of trust infrastructure.

21 Claims, 7 Drawing Sheets

U.S. PATENT DOCUMENTS

| | | | | |
|---|---|---|---|---|
| 2006/0285519 | A1* | 12/2006 | Narayanan et al. | 370/331 |
| 2007/0006296 | A1 | 1/2007 | Nakhjiri et al. | |
| 2007/0064647 | A1* | 3/2007 | Prasad | 370/331 |
| 2007/0101408 | A1* | 5/2007 | Nakhjiri | 726/4 |
| 2007/0150736 | A1* | 6/2007 | Cukier et al. | 713/172 |
| 2007/0154016 | A1* | 7/2007 | Nakhjiri et al. | 380/270 |
| 2008/0063205 | A1* | 3/2008 | Braskich et al. | 380/270 |
| 2008/0127317 | A1* | 5/2008 | Nakhjiri | 726/6 |
| 2008/0178274 | A1* | 7/2008 | Nakhjiri et al. | 726/9 |

FOREIGN PATENT DOCUMENTS

| | | |
|---|---|---|
| CN | 1889781 A | 1/2007 |
| WO | WO 2006/086932 A1 | 8/2006 |

OTHER PUBLICATIONS

Donghai Shi et al, An authentication method on security association for mobile IP fast handoff, pp. 1324-1327, IEEE, 2005.*

Neuman, Clifford, et al.; Title: "Kerberos: An Authentication Service for Computer Networks"; http://gost.isi.edu/publications/kerberos-neuman-tso.html; IEEE Communications Magazine, vol. 32, No. 9; Sep. 1994; 10 pgs.

Kohl, John T., et al.; Title: "The Evolution of the Kerberos Authentication Service"; EurOpen Conference in Tromso, Norway, Spring 1991; Published in IEEE Computer Society Press; 15 pgs.

McCann, P., et al., "IP Transform Policy Distribution using Mobile IP/Diameter; draft-mccann-transform-00.txt," Internet Engineering Task Force, Internet Draft, XP 015032265, Jun. 1, 1999, 16 pages, IEFT.

Perkins, C., "Mobile IP and Security Issue: An Overview," Proceedings of the First IEEE/Popov Workshop on Internet Technologies and Services, XP 010514313, Oct. 25-28, 1999, pp. 131-148, Piscataway, New Jersey.

Written Opinion of the International Searching Authority, International Application No. PCT/CN2007/071317, Applicant: Huawei Technologies Co., Ltd., et al., Date of completion: Feb. 22, 2008, 4 pages.

International Search Report, International Application No. PCT/CN2007/071317, Date of mailing: Mar. 6, 2008, 2 pages.

Supplementary European Search Report, European Application No. 07846143.1-2413, Applicant: Huawei Technologies Co., Ltd., Dated: Oct. 25, 2010, 9 pages.

* cited by examiner

TOKEN-BASED DYNAMIC KEY DISTRIBUTION METHOD FOR ROAMING ENVIRONMENTS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Communication networks allow users to communicate with other users and/or networks using various devices. Frequently, at least one of the devices is a wireless device that communicates with at least one wireless network. For example, a user may use their mobile device to attempt to contact another wireless device using a wireless network. The wireless network locates the other wireless device and establishes a communication path between the two devices, thereby allowing the devices to communicate. When the two devices are not part of the same wireless network, a plurality of wireless networks may work together to establish the communications link between the devices.

Verification of the identity of the devices is a constant problem in wireless communications. Specifically, wireless networks create an opportunity for unscrupulous users to eavesdrop on wireless communications and possibly impersonate a wireless device and/or wireless network. Thus, various solutions have been proposed for authenticating wireless devices and/or networks. However, few solutions address the situation where a mobile device roams into a foreign network and requests services from a network source. In such a case, the network source may have no way of authenticating the mobile device because there may not be a prior security association between the network source and the mobile device. Consequently, a need exists for a method of creating a security association between the network source and the mobile device when the mobile device is roaming in a foreign network.

SUMMARY

The disclosure includes a method for establishing a new security association between a mobile node and a network source, the method comprising creating a first token comprising a security association between a network source and a mobile node, the first token being encrypted using a first key known to the mobile node and a first trust authority within a home network associated with the mobile node, and creating a second token comprising the same security association between the network source and the mobile node, the second token being encrypted using a second key known to the first trust authority and a second trust authority associated with the network source, wherein the first token and the second token are sent to the second trust authority using a chain of trust infrastructure.

The disclosure also includes a network component comprising a processor configured to implement a method comprising receiving a first token encrypted with a first key and a second token encrypted with a second key, wherein the first key is unknown and the second key is known, decrypting the second token to produce a security association between a network source and a mobile node, creating a third token comprising the security association between the network source and the mobile node, the third token being encrypted using a third key that is known, and sending the first token and the third token to the network source, wherein the first token and the third token are used to establish the security association between the mobile node and the network source.

Further, the disclosure includes a network component comprising a processor configured to implement a method comprising receiving a first token comprising a security association between a network source and a mobile node, the first token being encrypted using a first key known to the mobile node and a home network, receiving a second token comprising the security association between the network source and the mobile node, the second token being encrypted using a second key known to a foreign network and the network source, decrypting the second token to produce the security association between the network source and the mobile node, creating a media independent handover (MIH) message, and sending the first token and the MIH message to the mobile node.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Described herein is a method for a security association to be established between a mobile node and a network source when a mobile node is not in communication with its home network. The method is generally implemented when the mobile node attempts to communicate with a network source, and the network source and the mobile node are unable to authenticate each other. In such a case, the network source sends an authentication request to the mobile node's home network via a foreign network. The home network may then create a security association between the mobile node and the network source, including an encryption key (a MN-NS key), and encrypt the MN-NS key in two tokens. The first token may only be decrypted by the mobile node, and the second token may only be decrypted by a trust authority in the foreign network. The two tokens are then sent to the foreign network, where the second token is decrypted to produce the MN-NS key, which is subsequently encrypted in a third token that may only be opened by the network source. The first token and the third token may then be sent to the network source, where the third token is decrypted to produce the MN-NS key. A media independent handover (MIH) message may then be created by the network source, and the MIH message and first token may be sent to the mobile node. The mobile node may then extract the MN-NS key from the first token and access the MIH message. By doing so, the mobile node and network source are able to authenticate each other, and secure communications between the mobile node and network source can commence. In addition, the method provides security to the MIH message, unlike the previous technologies.

Figure 1:
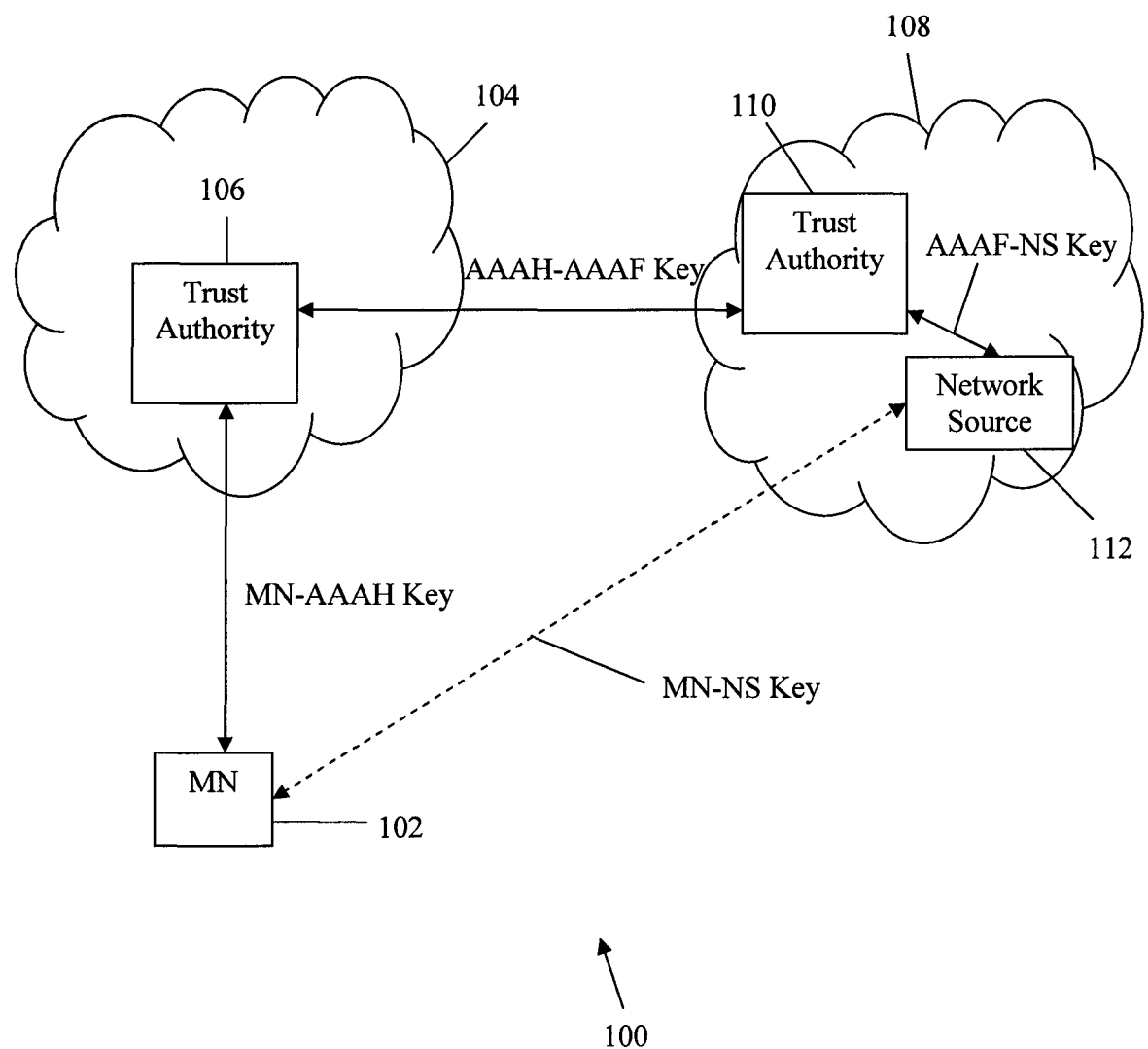
FIG. 1 is an illustration of an embodiment of the security relationships in a communications network.

FIG. 1 displays an embodiment of a system 100 comprised of a mobile node (MN) 102, a home network 104, and a foreign network 108. The home network 104 may contain a home network trust authority 106, and may have previously established security associations with the foreign network 108 and the mobile node 102. These security associations can include two keys: a home AAA-foreign AAA (AAAH-AAAF) key and an MN-home AAA (MN-AAAH) key. Similarly, the foreign network 108 may contain a foreign network trust authority 110, and may have previously established a security association with a network source (NS) 112 that includes a foreign AAA-NS (AAAF-NS) key. In an embodiment, the home network trust authority 106 and the foreign network trust authority 110 may be authentication, authorization, and accounting (AAA) servers that establish trust relationships using a trust infrastructure, such as an AAA protocol. By implementing the methods described herein, the MN-AAAH key, the AAAH-AAAF key, and the AAAF-NS key can be used to establish a security association between the MN 102 and the NS 112, which includes the MN-NS key. Specifically, the methods allow a trust relationship to be established between the MN 102 and the NS 112 using the chain of trust infrastructure that exists between the home network 104, the foreign network 108, and the NS 112.

The MN 102 may be any device that access or communicates, directly or indirectly, with the home network 104, the foreign network 108, and/or the NS 112. Specifically, the MN 102 is a device that may communicate with a plurality of wireless networks. The MN 102 may roam through the wireless networks, a term that includes those situations where the MN 102 moves from one wireless network to a different wireless network, or where the MN 102 is stationary and the wireless network coverage changes such that the MN 102 moves from one wireless network to another wireless network. Examples of suitable MNs 102 include personal digital assistants (PDAs), portable computers, such as laptop, notebook, and tablet computers, cellular telephones, and other mobile communication or computing systems. Other examples of suitable MNs 102 include other types of computers, such as desktop, workstation, and kiosk computers using a wireless network connection. Alternatively, the MN 102 may be any other type of computer or communication device known to persons of ordinary skill in the art.

The home network 104 and the foreign network 108 may be any type of network suitable for communicating with the MN 102. Specifically, the home network 104 and the foreign network 108 allow the MN 102 to communicate with other users, networks, and devices, such as the NS 112. In embodiments, the home network 104 may be defined as any network with which the MN 102 has a pre-existing security association, while the foreign network 108 may be defined as a network that lacks a pre-existing security relationship with the MN 102. For example, the home network 104 may be a first telecommunications provider network, while the foreign network 108 is a second telecommunications provider network. The home network 104 and the foreign network 108 may include infrastructure to carry out communications with a plurality of devices and networks, such as wireless transceivers and routing logic circuitry. Specific examples of a suitable home network 104 and foreign network 108 may include one or more of the following networks: the worldwide interoperability for microwave access (WiMAX), Wireless Fidelity (Wi-Fi), code division multiple access (CDMA), wideband CDMA (WCDMA), orthogonal frequency division multiple access (OFDMA), time division multiple access (TDMA), global system for mobile communications (GSM), enhanced data for GSM evolution (EDGE), universal mobile telecommunications system (UMTS), advanced mobile phone service (AMPS), one of the Institute for Electrical and Electronic Engineers (IEEE) 802 wireless networks, or any other wireless network. In other embodiments, one or both of the home network 104 and the foreign network 108 may be a public switched telephone network (PSTN), a packet switched network (PSN), an intranet, the internet, a local area network (LAN), or any other network known to persons of ordinary skill in the art.

The NS 112 is a user, network, or device with which the MN 102 wants to communicate or from which the MN 102 wants to receive some type of service. The NS 112 may be a third party entity or may be deployed by a network administrator. The NS 112 lacks a security association with the MN 102, and thus cannot authenticate the MN 102 when the MN 102 contacts the NS 112. Likewise, the lack of a security association between the MN 102 and the NS 112 means that the MN 102 cannot authenticate the NS 112. However, the NS 112 has a security association with the home network 104. Thus, the NS 112 may use the existing chain of trust infrastructure to form a security relationship with the MN 102. The NS 112 may communicate with one or more of the networks 104, 108, perhaps through the trust authorities 106, 110, to form such a security relationship. The NS 112 may include its own trust authority, such as an AAA module, to carry out such communication, if desired. The NS 112 may be located in the foreign network 108, but may alternatively be located in any other network, such as the home network 104 or a third party network.

As part of their routine activities, the home network 104 and/or the foreign network 108 may implement authentication, authorization, and/or accounting functions. Authentication may refer to the verification of the identity of a user, network, or device, whereas authorization may refer to the verification that the user, network, or device is entitled to the requested service and/or access. Accounting may refer to the measurement, communication, and/or billing of the service and/or access used by the user, network, or device. For example, when a cellular telephone tries to access a foreign network's server, the foreign network may need to authenticate the cellular telephone's identity and verify that the cellular telephone has the authority to access the server. When the cellular telephone is authenticated and authorized, the access is granted and the cellular telephone's usage is accounted. These functions may be implemented within, for example, the trust authorities 106, 110.

To assist with the authentication function, the components described herein may create security associations with each other. The security association may include an encryption key that allows two components to authenticate and communicate securely with each other. Specifically, the key is only known by the components involved in the security association so that any component can authenticate the source of a communication when the communication is encrypted using the key. If an unauthorized party intercepts the token, the unauthorized party will not be able to decrypt the token and read the contents. Similarly, the unauthorized party is not able to produce counterfeit tokens because the unauthorized party does not know the encryption key. Examples of these keys include the AAAH-AAAF key, the AAAF-NS key, the MN-AAAH key, and the MN-NS key shown in FIG. 1.

Figure 2:
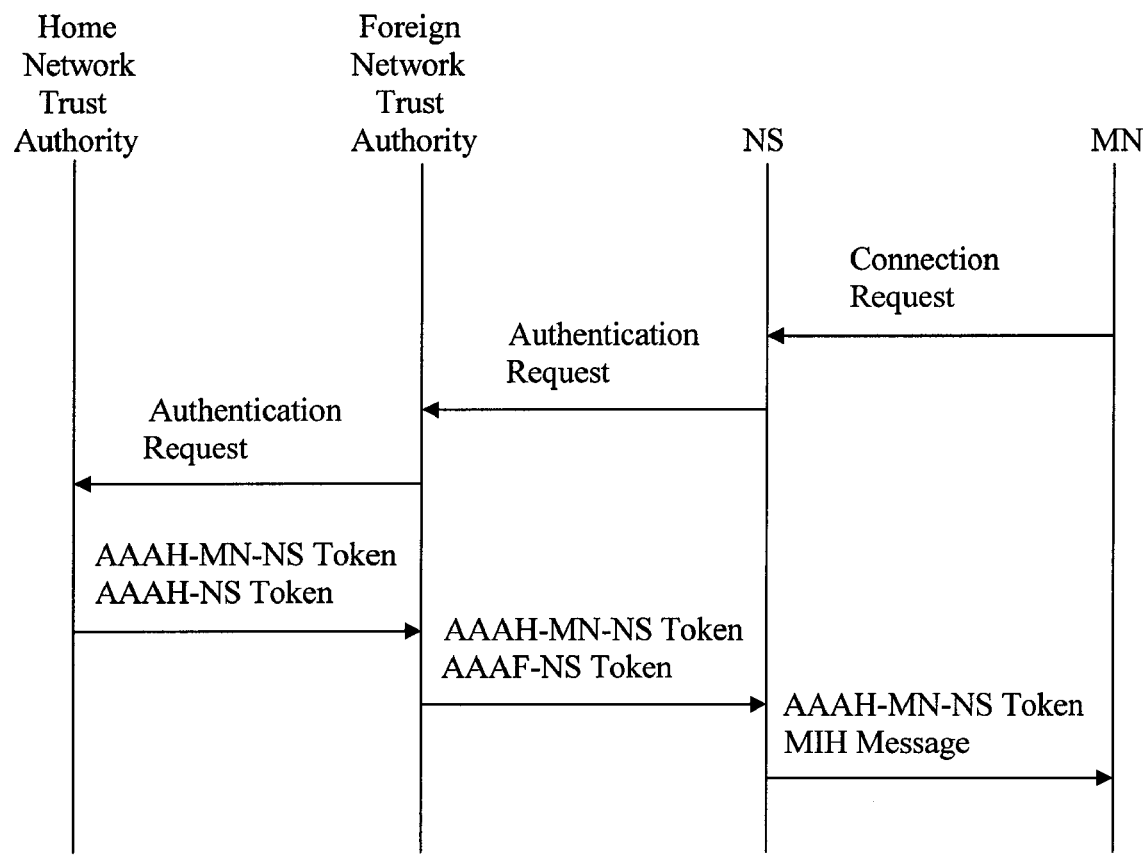
FIG. 2 is an illustration of an embodiment of a call flow within the network.

The keys described herein may be used to encrypt a plurality of tokens. A token may be defined as a data structure that carries a payload and is encrypted using the encryption key. Tokens are typically transmitted between components who have previously established the encryption key with each other. Thus, one component can use the key to encrypt a token, and then send the token to the other component. The other component can then decrypt the token using the key and extract the data. The data within the tokens may vary according to the needs of the individual components. However, in one embodiment, the tokens contain data used to authenticate the MN 102 and the NS 112, such as the MN-NS key. The token may also contain the validity period that defines the length of time a particular security association or key is valid, after which time the security association or key expires. The token may also contain identifiers that identify the various components associated with the token, the MN 102, or the NS 112. For example, the token may contain one or more of a MN identifier (MN-ID), a home network trust authority identifier (AAAH-ID), a foreign AAA identifier (AAAF-ID), and a network source identifier (NS-ID). FIG. 2 contains three examples of these tokens. As explained in detail below, the AAAH-MN-NS token may be encrypted with the MN-AAAH key, the AAAH-NS token may be encrypted with the AAAH-AAAF key, and the AAAF-NS token may be encrypted with the AAAF-NS key.

FIG. 2 is an illustration of an example of the call flow between the home network trust authority 106, the foreign network trust authority 110, the NS 112, and the MN 102. When the MN 102 wants to communicate with the NS 112, the MN 102 sends a connection request to the NS 112. If the NS 112 cannot authenticate the MN 102, the NS 112 may send an authentication request to the foreign network trust authority 110 or another component within the foreign network 108. If the foreign network trust authority 110 cannot authenticate the MN 102, then the foreign network trust authority 110 forwards the authentication request to the home network trust authority 106 or another component in the home network 104. As described in further detail below, upon receiving the authentication request, the home network trust authority 106 creates a security association between the MN 102 and the NS 112 that includes the MN-NS key, and encrypts the MN-NS key in two tokens, the AAAH-MN-NS token and the AAAH-NS token. The home network trust authority 106 then sends the AAAH-MN-NS token and the AAAH-NS token to the foreign network trust authority 110.

The foreign network trust authority 110 decrypts the AAAH-NS token with the AAAH-AAAF key, and creates the AAAF-NS token using the AAAF-NS key. The foreign network trust authority 110 then sends the AAAF-NS token and the AAAH-MN-NS token to the NS 112. The NS 112 decrypts the AAAF-NS token with the AAAF-NS key, and creates a media independent handover (MIH) message for the MN 102. The MIH message contains various information that allows the MN 102 and the NS 112 to communicate with each other. The NS 112 then sends the MIH message and the AAAH-MN-NS token to the MN 102. When the MN 102 decrypts the AAAH-MN-NS token, both the MN 102 and the NS 112 have the MN-NS key. The MN 102 and NS 112 may then authenticate each other and communicate securely with one another.

Figure 3:
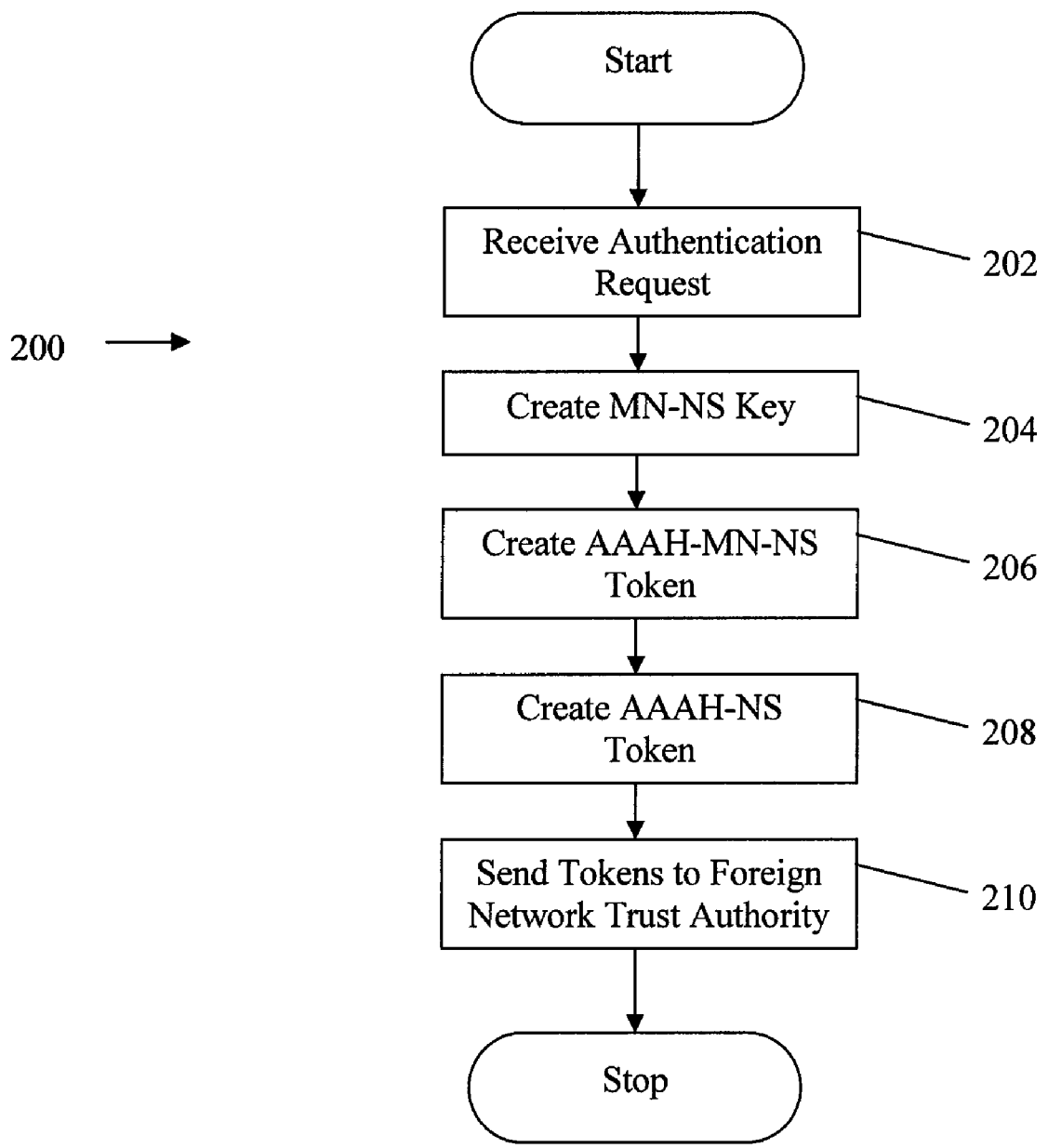
FIG. 3 is a flowchart of an embodiment of a home network authentication method.
Figure 4:
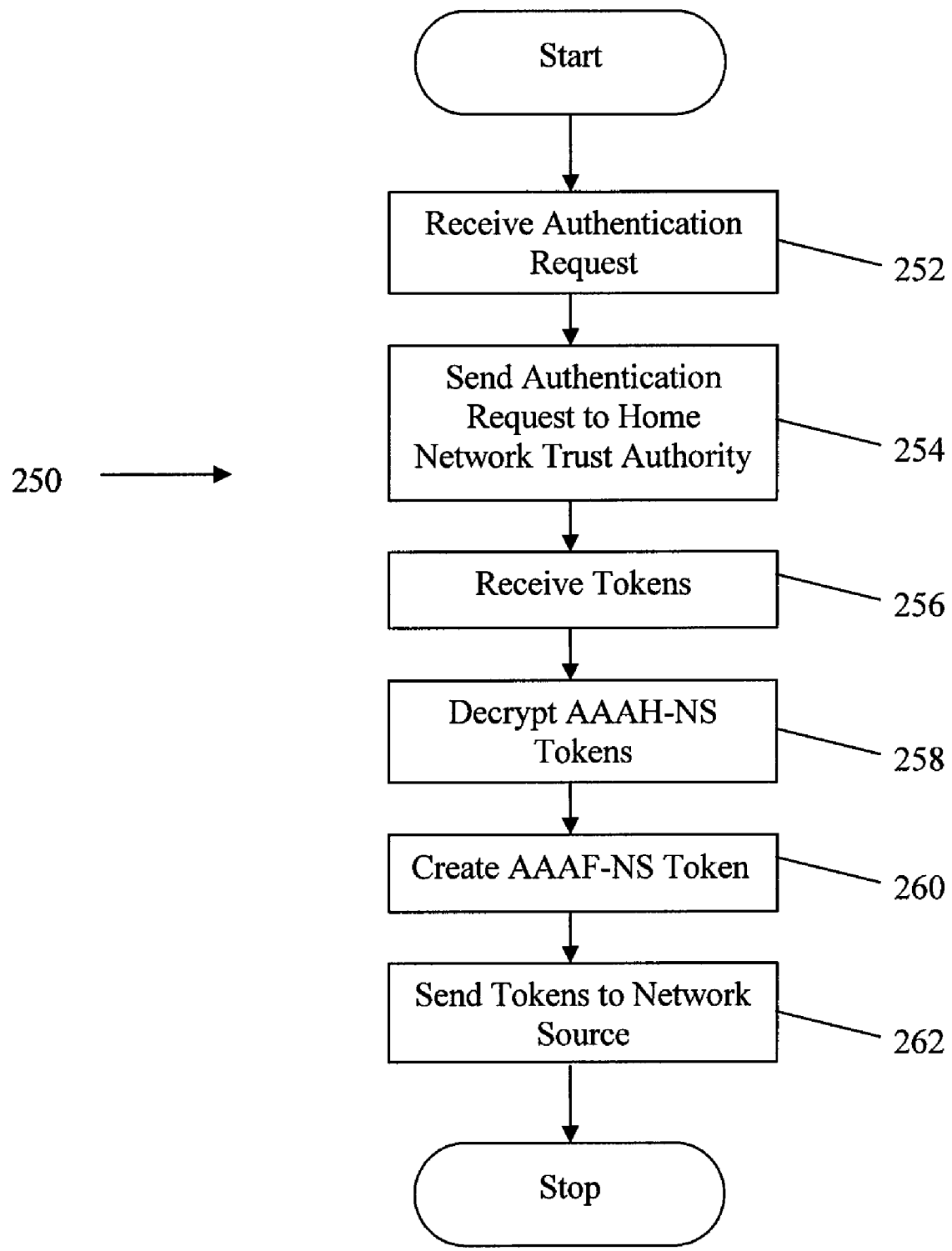
FIG. 4 is a flowchart of an embodiment of a foreign network authentication method.
Figure 5:
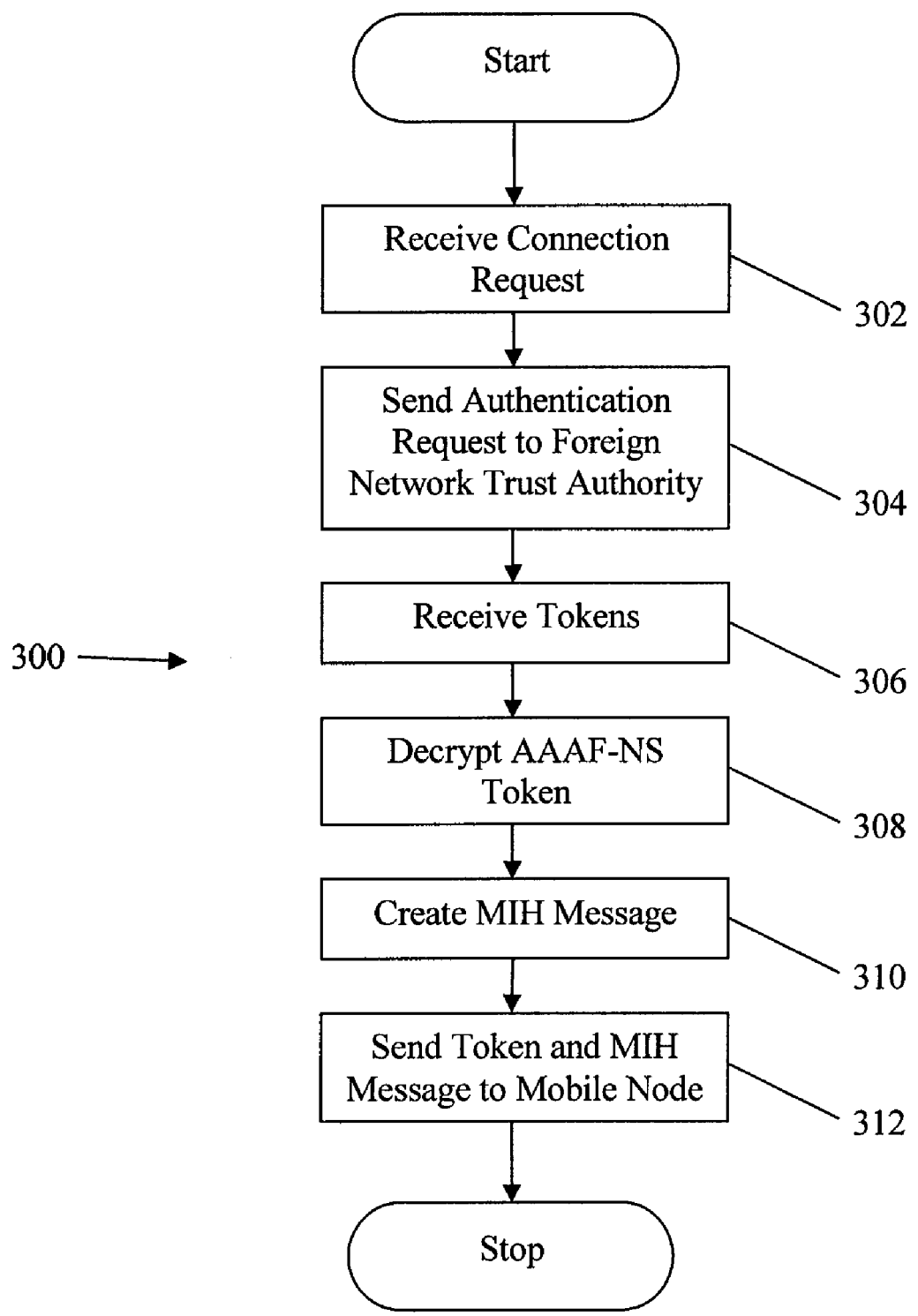
FIG. 5 is a flowchart of an embodiment of a network source authentication method.
Figure 6:
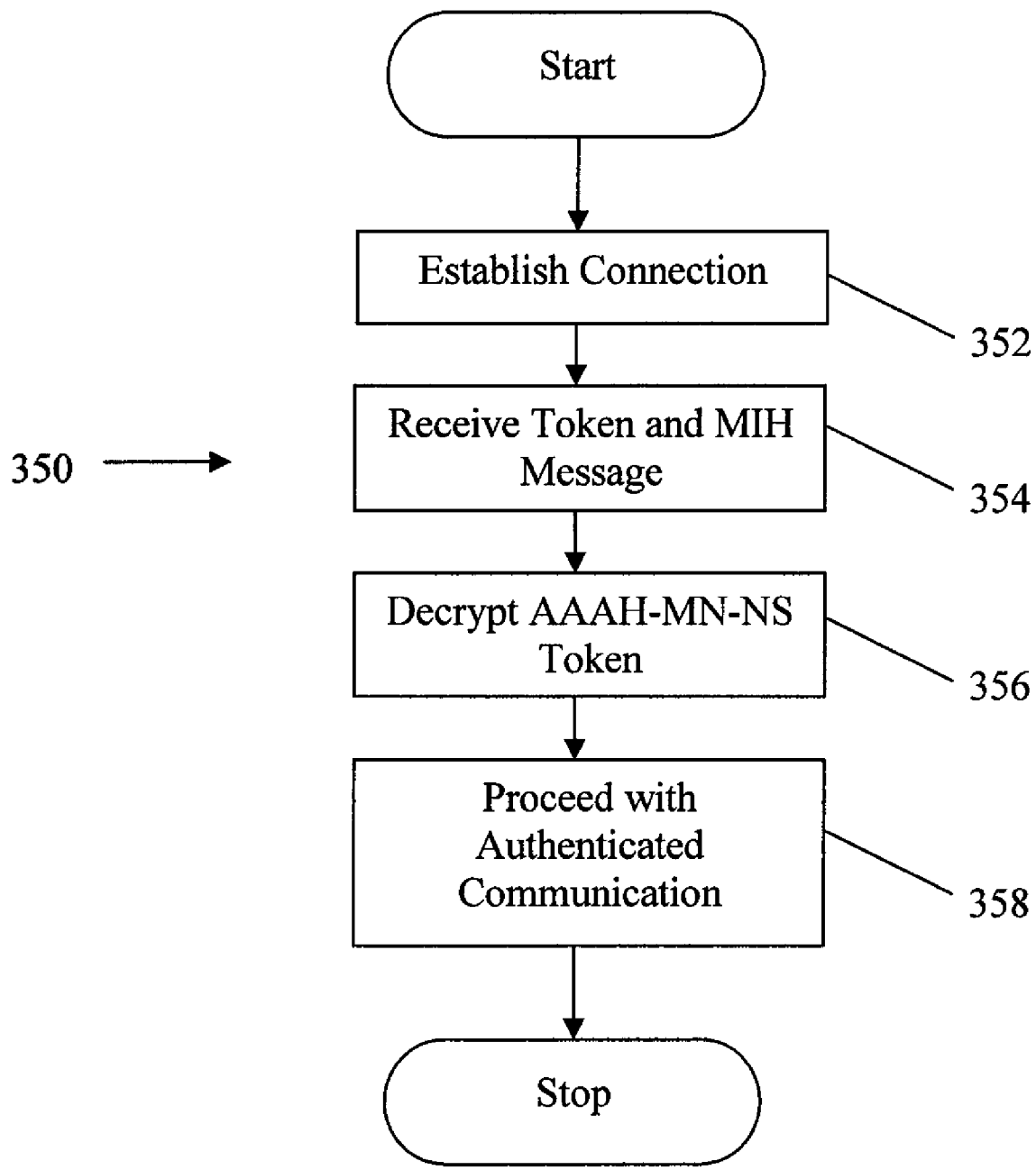
FIG. 6 is a flowchart of an embodiment of a mobile node authentication method.

FIGS. 3-6 illustrate the processes that occur within each of the components illustrated in FIG. 2. Specifically, FIG. 3 illustrates the process that occurs at the home network 104, FIG. 4 illustrates the process that occurs at the foreign network 108, FIG. 5 illustrates the process that occurs at the NS 112, and FIG. 6 illustrates the process that occurs at the MN 102. Each of these figures is described in greater detail below.

FIG. 3 is a flowchart of one embodiment of a home network authentication method 200. The home network authentication method 200 creates a security association between the NS 112 and the MN 102, including the NS-MN key, so that the NS 112 and the MN 102 can authenticate each other. The home network authentication method 200 encrypts the NS-MN key in two tokens that are ultimately sent to the MN 102 and the NS 112. The home network authentication method 200 is generally implemented in the home network trust authority 106, but may also be implemented in any of the other components described herein.

The home network authentication method 200 starts when the home network 104 receives an authentication request at block 202. The authentication request asks for verification of the MN's identity so that the NS 112 may authenticate the MN 102. The authentication request may come from the foreign network trust authority 110 in the foreign network 108, or may come from any other component, such as another component in the foreign network 108 or the NS 112. The home network authentication method 200 then proceeds to block 204 where the MN-NS key is created. The MN-NS key is created as part of the security association between the NS 112 and the MN 102. Specifically, the MN-NS key allows the MN 102 and the NS 112 to authenticate each other and engage in secure communications. In contrast with some of the other keys described herein, the MN-NS key may not previously exist, but may instead be created when there is a need for authentication between the MN 102 and the NS 112. The MN-NS key is typically created at the home network 104, but may also be created in any of the other components described herein. The home network authentication method 200 then proceeds to block 206.

At block 206, the AAAH-MN-NS token is created. The AAAH-MN-NS token may be a token that is encrypted with the MN-AAAH key and contains a copy of the MN-NS key. The AAAH-MN-NS token may also contain the MN-ID, the AAAH-ID, the AAAF-ID, the NS-ID, and/or the validity period for the MN-NS key. After creating the AAAH-MN-NS token, the home network authentication method 200 proceeds to block 208 where the AAAH-NS token is created. The AAAH-NS token may be a token that is encrypted with the AAAH-AAAF key and contains a copy of the MN-NS key. The AAAH-NS token may also contain the MN-ID, the AAAH-ID, the AAAF-ID, the NS-ID, and/or the validity period for the MN-NS key. After creating the AAAH-NS token, the home network authentication method 200 proceeds to block 210 where the two tokens are sent to the component that requested authentication of the MN 102. Generally, the foreign network trust authority 110 requests authentication of the MN 102, thus the two tokens are sent to the foreign network trust authority 110. However, persons of ordinary skill in the art will appreciate that the two tokens may be sent to any component that has a security association with the home network 104. After sending the tokens, the home network authentication method 200 terminates.

FIG. 4 is a flowchart of an embodiment of a foreign network authentication method 250. The foreign network authentication method 250 acts as an intermediary, allowing the security associations between the foreign network 108 and the other components to be used to send the MN-NS key to the NS 112 and the MN 102. Specifically, when the foreign network 108 receives the authentication request, the foreign network 108 cannot authenticate the MN 102 due to a lack of a security association with the MN 102, and instead forwards the authentication request to the home network 104. In response, the home network 104 sends the AAAH-MN-NS token and the AAAH-NS token to the foreign network 108. The foreign network 108 then decrypts the AAAH-NS token to produce the MN-NS key, and encrypts the MN-NS key in the AAAF-NS token. The AAAF-NS token and the AAAH-MN-NS token are then sent to the NS 112. The foreign authentication method 250 may be implemented in the foreign network trust authority 110, but may also be implemented in any of the other components described herein.

The foreign network authentication method 250 starts when the foreign network 108 receives an authentication request at block 252. The authentication request asks for verification of the MN's identity so that the NS 112 may authenticate the MN 102. The authentication request may come from the NS 112, or may come from any other component, such as another component in the foreign network 108 or another intermediate network. If the foreign network authentication method 250 is unable to authenticate the MN 102, then the foreign network authentication method 250 proceeds to block 254 where the foreign network authentication method 250 sends the authentication request to the home network trust authority 106 or another network component with a security association with the foreign network 108. The foreign network authentication method 250 then proceeds to block 256.

At block 256, the foreign network 108 receives the AAAH-MN-NS token and the AAAH-NS token. The foreign network may receive the AAAH-MN-NS token and the AAAH-NS token from the home network 104, but may also receive the AAAH-MN-NS token and the AAAH-NS token from another network, such as an intermediary network. The foreign network 108 cannot decrypt the AAAH-MN-NS token because the AAAH-MN-NS token is encrypted with the MN-AAAH key, which is not known by the foreign network 108. However, the foreign network can decrypt the AAAH-NS token because it is encrypted with the AAAH-AAAF key, which is known by the foreign network 108. Thus, the foreign network authentication method 250 proceeds to block 258 where the foreign network 108 decrypts the AAAH-NS token to produce the contents of the AAAH-NS token, including the MN-NS key. The foreign network authentication method 250 then proceeds to block 260.

At block 260, the AAAF-NS token is created. The AAAF-NS token may be a token that is encrypted with the AAAF-NS key and contains a copy of the MN-NS key. The AAAF-NS token may also contain the MN-ID, the AAAH-ID, the AAAF-ID, the NS-ID, and/or the validity period for the MN-NS key. After creating the AAAF-NS token, the foreign network authentication method 250 proceeds to block 262 where the AAAF-NS token and the AAAF-MN-NS token are sent to the component that requested authentication of the MN 102. Generally, the NS 112 requests authentication of the MN 102, thus the two tokens are sent to the NS 112. However, persons of ordinary skill in the art will appreciate that the two tokens may be sent to any component that has a security association with the foreign network 108. After sending the two tokens, the foreign network authentication method 250 terminates.

FIG. 5 is a flowchart of an embodiment of a network source authentication method 300. The network source authentication method 300 acts, in part, as an intermediary, allowing the security association between the NS 112 and other components to be used to send the MN-NS key to the NS 112 and the MN 102. Specifically, when the NS 112 receives a connection request from the MN 102, the NS 112 cannot approve the request due to a lack of a security association with the MN 102, and forwards the authentication request to the foreign network trust authority 106. In response, the foreign network 108 sends the AAAH-MN-NS and AAAF-NS tokens to the NS 112. The NS 112 then decrypts the AAAF-NS token to produce the MN-NS key, and creates the MIH message. The MIH message and the AAAH-MN-NS token are then sent to the MN 102. The network source authentication method 300 may be implemented in the NS 112, but may also be implemented in any of the other components described herein.

The network source authentication method 300 starts when the NS 112 receives a connection request at block 302. The connection request is a message received from the MN 102 in which the MN 102 asks for access to or services from the NS 112. In an embodiment, the connection request may be routed through the foreign network 108. The connection request cannot be granted until the MN 102 is authenticated. If the NS 112 is unable to authenticate the MN 102, then the network source authentication method 300 proceeds to block 304 where the network source authentication method 300 sends the authentication request to the foreign network trust authority 106 or another network component with a security association with the foreign network 108. The network source authentication method 300 then proceeds to block 306.

At block 306, the network source 108 receives the AAAH-MN-NS token and the AAAF-NS token. Generally, the network source may receive the AAAH-MN-NS token and the AAAF-NS token from the foreign network 108, but may also receive the AAAH-MN-NS token and the AAAF-NS token from another network, such as an intermediary network. The NS 112 cannot decrypt the AAAH-MN-NS token because the AAAH-MN-NS token is encrypted with the MN-AAAH key, which is not known by the NS 112. However, the NS 112 can decrypt the AAAF-NS token because it is encrypted with the AAAF-NS key, which is known by the NS 112. Thus, the network source authentication method 300 proceeds to block 308 where the NS 112 decrypts the AAAF-NS token to produce the contents of the AAAF-NS token, including the MN-NS key. The MN-NS key may be used to authenticate and communicate securely with the MN. The network source authentication method 300 then proceeds to block 310.

At block 310, the MIH message is created. The MIH message is a message that contains information that the MN 102 needs to communicate with the foreign network 108 and/or the NS 112. The MIH message may be used in handovers across different wireless technologies. The MIH message may contain various information, such as information and/or directives related to the surrounding networks and signals from the NS 112, such as handover commands, triggers, and neighboring network information. The MIH message may be encrypted with the MN-NS key, if desired. The network source authentication method 300 then proceeds to block 312 where the AAAH-MN-NS token and MIH message are sent to the MN 102. The AAAH-MN-NS token and the MIH message may be sent to the MN 102 via an intermediary network, if desired. After sending the AAAH-MN-NS token and the MIH message, the network source authentication method 300 terminates.

FIG. 6 is a flowchart of an embodiment of a mobile node authentication method 350. The mobile node authentication method 350 is implemented when the MN 102 wants to communicate with the NS 112. However, the MN 102 lacks a security association with the NS 112, so the MN 102 cannot authenticate the NS 112. Thus, the connection request may include an authentication request. When the components, e.g. the foreign network 108, the NS 112, and the home network 104, receive the authentication request and send the corresponding tokens and keys, then the MN 102 receives the MIH message and the AAAH-MN-NS token, which contains the MN-NS key. When the MN 102 receives the AAAH-MN-NS token, the MN 102 decrypts the AAAH-MN-NS token with the MN-AAAH key, authenticates the NS 112, and proceeds with authenticated and/or secure communications. The mobile node authentication method 350 is typically implemented in the MN 102, but may also be implemented in any of the other components described herein.

The mobile node authentication method 350 starts when a connection request is sent to the MN 102. The connection request may include an authentication request and/or a request for the information contained in the MIH message. The connection request may be sent through an intermediate network, if desired. After sending the correction request, the mobile node authentication method 350 proceeds to block 354 where the AAAH-MN-NS token and the MIH message are received. The AAAH-MN-NS token and MIH message are generally received from the NS 112, but may also be received from another component, such as the foreign network 108. After receiving the AAAH-MN-NS token and MIH message, the mobile node authentication method 350 proceeds to block 356 where the mobile node authentication method 350 decrypts the AAAH-MN-NS token. The MN 102 can decrypt the AAAH-MN-NS token because the MN 102 contains the MN-AAAH key. When the MN 102 decrypts the AAAH-MN-NS token, the MN-NS key and any other contents of the AAAH-MN-NS token are produced. Since both the NS 112 and the MN 102 now know the MN-NS key, the MN 102 and the NS 112 can authenticate and securely communicate with each other. After the AAAH-MN-NS token is decrypted, the mobile node the authentication method 350 then proceeds to block 358.

At block 358, the MN 102 proceeds with the authenticated communications. Because the MN 102 and the NS 112 both possess copies of the MN-NS key, the MN 102 and the NS 112 can authenticate and securely communicate with each other. The MN 102 uses the information in the MIH message to facilitate communications with the NS 112, which may include access and/or services. The MIH message may be authenticated or verified by the method authentication call (MAC), which is a type of signature. The communication may proceed through an intermediate network, such as foreign network 108, if desired. The mobile node authentication method 350 then terminates.

Various alterations may be made to the methods described herein. For example, the home network 104 may send the AAAH-NS token to the foreign network 108 without receiving an authentication request, an action that can be described as a proactive push. Alternatively, the NS 112 may request one of the tokens prior to receiving the connection request from the MN 102. Such a request can be described as a proactive pull. Alternatively, the method described herein can be implemented in the reverse direction where an untrusted MN sends a MIH message to a third party network. Furthermore, the home network 104 can create generic tokens for the foreign network 108, and allow the foreign network to complete the tokens for any NS 112. In addition, the home network 104 may create a generic, non-MN specific token for the foreign network 108 such that the foreign network 108 may create the MN-NS key and/or token for the NS. In such a case, the MN may still need to get its token from the home network 104, for example as part of the handover process.

Figure 7:
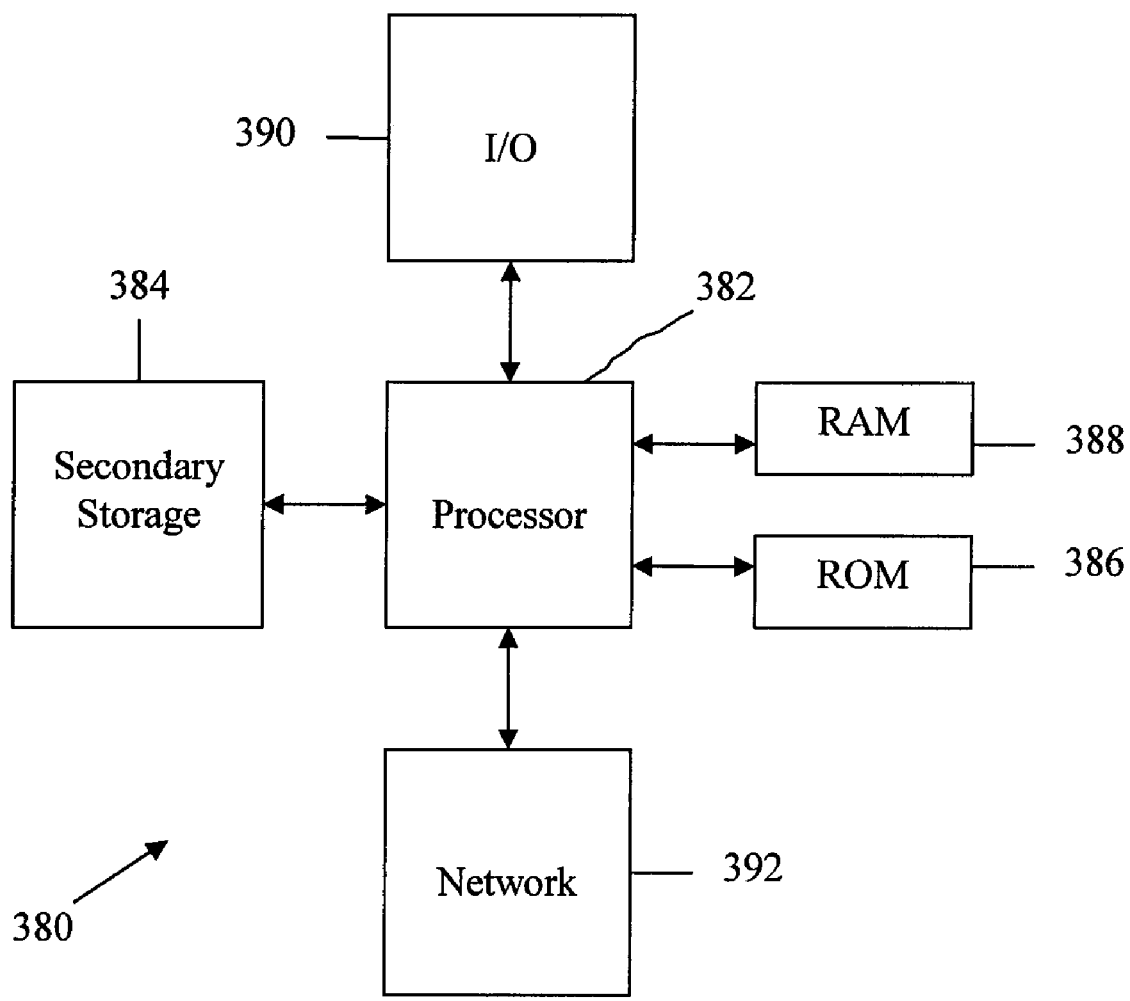
FIG. 7 illustrates an exemplary general-purpose computer system suitable for implementing the several embodiments of the disclosure.

The network described above may be implemented on any general-purpose network component, such as a computer, router, switch, or bridge, with sufficient processing power, memory resources, and network throughput capability to handle the necessary workload placed upon it. FIG. 7 illustrates a typical, general-purpose network component suitable for implementing one or more embodiments of a node disclosed herein. The network component 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs that are loaded into RAM 388 when such programs are selected for execution. The ROM 386 is used to store instructions and perhaps data that are read during program execution. ROM 386 is a non-volatile memory device that typically has a small memory capacity relative to the larger memory capacity of secondary storage. The RAM 388 is used to store volatile data and perhaps to store instructions. Access to both ROM 386 and RAM 388 is typically faster than to secondary storage 384.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for establishing a new security association between a mobile node and a network source, the method comprising:
   a first trust authority creating a first token comprising a security association between a network source and a mobile node, the first token being encrypted using a first key known to the mobile node and the first trust authority within a home network associated with the mobile node;
   the first trust authority creating a second token comprising the security association between the network source and the mobile node, the second token being encrypted using a second key known to the first trust authority and a second trust authority associated with the network source; and
   sending the first token and the second token to the second trust authority using a chain of trust infrastructure,
   wherein the network source uses a third key known to the second trust authority and the network source to decrypt a third token, the third token comprising the security association between the network source and the mobile node, and wherein the network source uses the security association between the network source and the mobile node to create a media independent handover (MIH) message for the mobile node.

2. The method of claim 1 wherein the chain of trust infrastructure is an authentication, authorization, and accounting (AAA) protocol.

3. The method of claim 1 wherein the first trust authority is a home AAA server.

4. The method of claim 1 wherein the second token further comprises: a message authentication key, an information encryption key, and a key validity period.

5. The method of claim 1 wherein the first key is a long term secret or a short-term secret established as part of an earlier authentication between the mobile node and the home network.

6. The method of claim 5 wherein the method further comprises:
   receiving an authentication request; and
   creating the first token and the second token in response to the authentication request.

7. The method of claim 1 wherein the method is implemented when the mobile node is not in direct communication with the home network.

8. The method of claim 1 wherein the second trust authority is the network source, and wherein the network source has a security relationship with the home network.

9. The method of claim 1, wherein the network source is within a foreign network.

10. The method of claim 9 wherein the second trust authority is an authentication, authorization, and accounting (AAA) server in the foreign network.

11. The method of claim 10 wherein the network source is not an AAA client of a foreign network AAA server and has a relationship with the foreign network through the AAA client of the foreign network AAA server.

12. The method of claim 1 wherein the home network sends the first token and the second token proactively based on a trigger from a set of sources comprising a trust authority, another network, or the mobile node.

13. The method of claim 1:
   wherein the second trust authority decrypts the second token to produce the security association between the network source and the mobile node, creates the third token, the third token being encrypted using the third key, and sends the first token and the third token to the network source, and
   wherein the network source sends the MIH message to the mobile node.

14. A network component comprising:
   a processor configured to implement a method for establishing a new security association between a mobile node and a network source, the method comprising:
   creating a first token comprising a security association between a network source and a mobile node, the first token being encrypted using a first key known to the mobile node and a first trust authority within a home network associated with the mobile node;
   creating a second token comprising the security association between the network source and the mobile node, the second token being encrypted using a second key known to the first trust authority and a second trust authority associated with the network source; and
   sending the first token and the second token to the second trust authority using a chain of trust infrastructure,
   wherein the network source uses a third key known to the second trust authority and the network source to decrypt a third token, the third token comprising the security association between the network source and the mobile node, and wherein the network source uses the security association between the network source and the mobile node to create a media independent handover (MIH) message for the mobile node.

15. The network component of claim 14, wherein the chain of trust infrastructure is an authentication, authorization, and accounting (AAA) protocol.

16. The network component of claim 14, wherein the first trust authority is a home AAA server.

17. The network component of claim 14, wherein the second token further comprises:
   a message authentication key, an information encryption key, and a key validity period.

18. The network component of claim 14, wherein the first key is a long term secret or a short-term secret established as part of an earlier authentication between the mobile node and the home network.

19. The network component of claim 14, wherein the processor implements the method when the mobile node is not in direct communication with the home network.

20. The network component of claim 14, wherein the network source is within a foreign network, and wherein the second trust authority is an authentication, authorization, and accounting (AAA) server in the foreign network.

21. The network component of claim 14, wherein the home network sends the first token and the second token proactively based on a trigger from a set of sources comprising a trust authority, another network, or the mobile node.

* * * * *